United States Patent [19]
Hill et al.

[11] Patent Number: 5,694,454
[45] Date of Patent: Dec. 2, 1997

[54] APPARATUS FOR MESSAGE RE-TRANSMISSION ON DEMAND

[75] Inventors: Thomas Casey Hill, Wellington; Kwok Keung Choi, Coral Springs; Tri Thien Dang, Coconut Creek; Lowell C. Hufferd, III, Delray, all of Fla.

[73] Assignee: Motorola, Inc., Schaumburg, Ill.

[21] Appl. No.: 434,211

[22] Filed: May 4, 1995

[51] Int. Cl.⁶ .......................... H04M 11/00; H04Q 7/08
[52] U.S. Cl. .................. 379/58; 340/825.44; 379/89
[58] Field of Search .................. 379/58, 57, 59, 379/93, 89; 341/110; 380/29; 370/58.1; 340/825.44, 825.36

[56] References Cited

U.S. PATENT DOCUMENTS

| | | |
|---|---|---|
| 4,124,773 | 11/1978 | Elkins . |
| 4,803,487 | 2/1989 | Willard et al. . |
| 4,811,379 | 3/1989 | Grandfield . |
| 4,868,560 | 9/1989 | Oliwa et al. . |
| 4,905,003 | 2/1990 | Helferich ...................... 341/110 |
| 4,928,096 | 5/1990 | Leonardo et al. . |
| 5,239,306 | 8/1993 | Siwiak et al. . |
| 5,305,384 | 4/1994 | Ashby et al. ...................... 380/29 |
| 5,351,235 | 9/1994 | Lahtinen ...................... 370/58.1 |
| 5,418,835 | 5/1995 | Frohman et al. ...................... 379/57 |
| 5,420,911 | 5/1995 | Dahlin et al. ...................... 379/59 |
| 5,452,289 | 9/1995 | Sharma et al. ...................... 379/93 X |
| 5,479,411 | 12/1995 | Klein ...................... 370/110.1 |

*Primary Examiner*—Dwayne Bost
*Assistant Examiner*—S. H. Richardson
*Attorney, Agent, or Firm*—Philip P. Macnak

[57] ABSTRACT

A communication system (100) providing analog message re-transmission on demand comprises a base station (114) and at least one portable communication transceiver (118). The base station (114) transmits an address (414) identifying the portable communication transceiver (118) to which a voice message is directed, and a session number (415) modulated in a first modulation format and a compressed analog message (418) representing the voice message modulated in a second modulation format. When the signal quality of the voice message played back in the portable communication transceiver (118) is perceived by the user to be unintelligible, the user can receive from the base station (114) a re-transmission of the compressed analog message (418) by generating a request for re-transmission of the compressed analog message (418).

20 Claims, 6 Drawing Sheets

APPARATUS FOR MESSAGE RE-TRANSMISSION ON DEMAND

FIELD OF THE INVENTION

This invention relates in general to communication systems, and more specifically to an apparatus and method for message re-transmission on demand.

BACKGROUND OF THE INVENTION

Communication systems having two-way communication between base stations and portable communication transceivers have provided an important link for the base stations to determine the reliability of a message transmission. Such two-way communication systems have allowed a caller using the communication system to know that the called party has received the caller's message.

For mixed signaling systems where the two-way communication protocol incorporates both digital and analog signaling formats, reliable message transmissions can not always be readily determined for the analog portion of the message. Addressing information sent by the base stations in a digital format to portable communication transceivers can be verified using convention error detection techniques. However, the analog information, for example, compressed analog voice, can not use such conventional error detection techniques. For this reason, a message composed of digital addressing and analog messaging formats can only be verified in the above mentioned two way communication systems for the digital portion. The user can subsequently play out a voice message which has been received and is unintelligible, but as provided by the communication system to the user, a reliable message transaction between the base stations and the portable transceiver has occurred.

Thus, what is needed is an apparatus and method to allow a user of a portable communication transceiver to request message re-transmission on demand when the message is perceived unintelligible by the user.

DESCRIPTION OF THE PREFERRED EMBODIMENT

Figure 1:
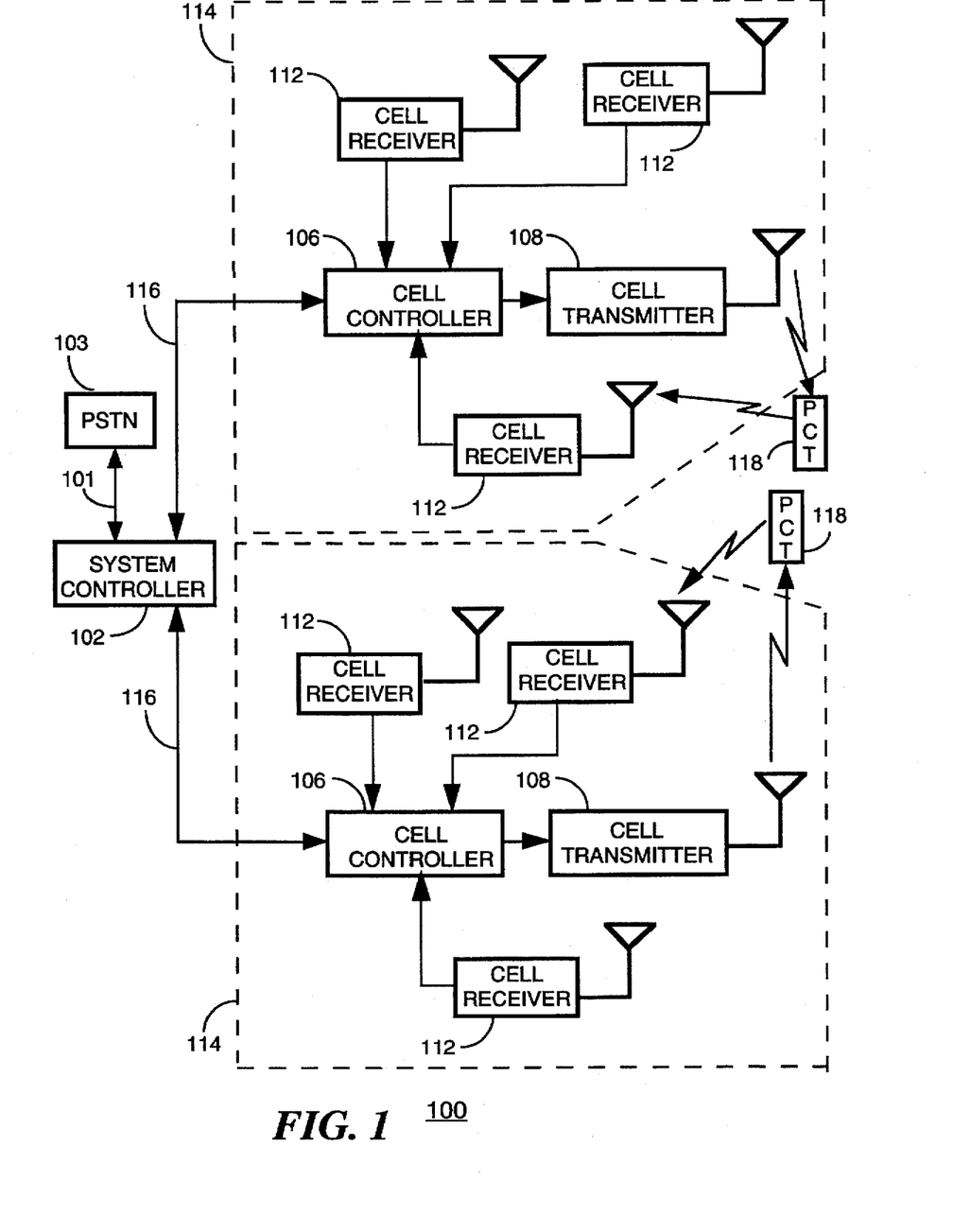
FIG. 1 is an electrical block diagram of a communication system in accordance with the preferred embodiment of the present invention.

Referring to FIG. 1, an electrical block diagram of a communication system 100 in accordance with the preferred embodiment of the present invention comprises a fixed portion and a portable portion. The fixed portion includes a plurality of base stations 114, utilizing conventional techniques well known in the art, coupled by communication links 116 to a system controller 102 which controls the base stations 114. In the preferred embodiment of the present invention, the system controller 102 is preferably a Wireless Messaging Gateway (WMG™) Administrator! paging control center such as manufactured by Motorola, Inc. of Schaumburg, Ill. and the base stations 114 are preferably Nucleus™ Orchestra! base stations such as manufactured by Motorola, Inc. of Schaumburg, Ill. It will be appreciated that other similar controller hardware can be utilized as well for the system controller 102 and base stations 114.

Each of the base stations 114 transmits radio signals to a plurality of portable communication transceivers 118 via a cell transmitter 108. The base stations 114 in turn each receive radio signals from the plurality of portable communication transceivers 118 via a cell receiver 112, three of which are shown by way of example in each cell. Both the cell transmitter 108 and the cell receiver 112 are coupled to a cell controller 106 which controls transmission and reception processes. The radio signals comprise selective call addresses and messages transmitted to the portable communication transceivers 118 on an outbound channel and acknowledgments and/or re-transmission requests received from the portable communication transceivers 118 on an inbound channel. The system controller 102 is coupled by telephone links 101 to a public switched telephone network (PSTN) 103 for receiving messages therefrom. The messages, which include voice and data messages from the PSTN 103, are generated, for example, using a conventional telephone coupled to the PSTN 103 in a manner that is well known in the art.

Outbound addressing information transmissions between the base stations 114 and the portable communication transceivers 118 preferably utilize a digital selective call signaling protocol similar to Motorola's FLEX™. This protocol utilizes well-known error detection and error correction techniques and is therefore tolerant to bit errors occurring during transmission, provided that the bit errors are not too numerous in any one code word. The outbound voice message transmissions are preferably analog voice message transmissions utilizing amplitude modulation (AM) techniques, preferably AM single side band (SSB). Thus, outbound message transmissions utilize a mixed signaling format comprising a digital portion for addressing information transmission and an analog portion for analog voice message transmission. The inbound channel also utilizes a digital signaling format.

Outbound addressing information transmissions from the base stations 114 preferably utilize two and four level frequency shift keyed (FSK) modulation, operating at sixteen-hundred or thirty-two-hundred symbols-per-second (sps). Inbound channel transmissions from the portable communication transceivers 118 to the base stations 114 preferably also utilize four level FSK modulation at a rate of eight-hundred bits per second (bps). Inbound channel transmissions occur during predetermined data packet time slots synchronized with the outbound channel transmissions. It will be appreciated that, alternatively, other signaling protocols, modulation schemes, and transmission rates can be utilized as well for either or both transmission directions. The outbound and inbound channels preferably operate on two different carrier frequencies utilizing well known frequency division multiplexing (FDM) techniques. It will be further appreciated that, alternatively, the outbound and inbound channels can operate on a single carrier frequency utilizing well known time division duplex (TDD) techniques for sharing the frequency.

Figure 2:
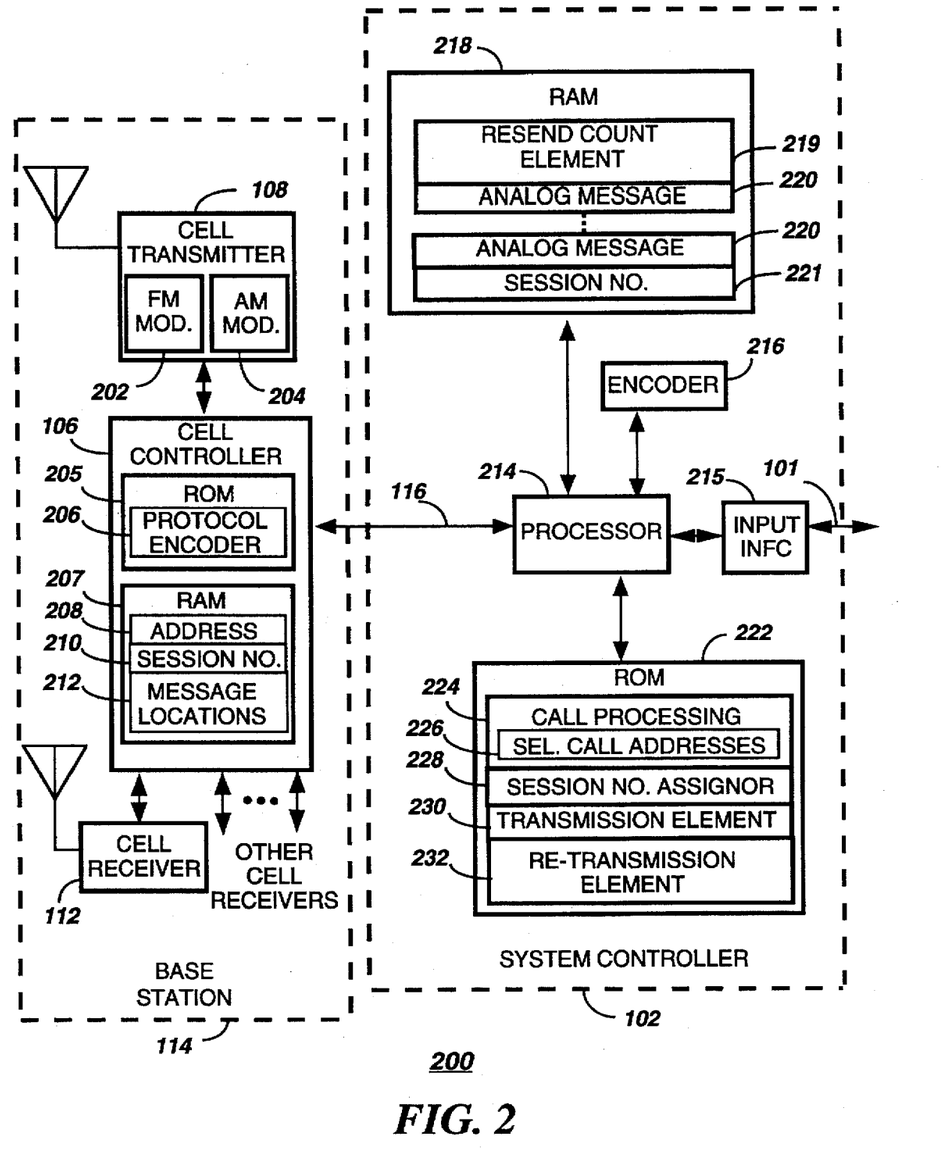
FIG. 2 is an electrical block diagram of the fixed portion of the communication system in accordance with the preferred embodiment of the present invention.

Referring to FIG. 2, an electrical block diagram of the fixed portion 200 of the communication system 100 in accordance with the preferred embodiment of the present invention comprises the system controller 102 and the base stations 114, one of which is shown. The system controller 102 includes a processor 214 for directing operation of the system controller 102. The processor 214 is coupled to the base stations 114 through communication links 116, well known in the art, such as a direct wire line (telephone) link, a data communication link, or any number of radio frequency links, such as a radio frequency (RF) transceiver link, a microwave transceiver link, or a satellite link, just to mention a few.

The processor 214 is also coupled to an input interface 215 for communicating with the PSTN 103 via telephone links 101 for receiving messages. The processor 214 is also coupled to a random access memory (RAM) 218 having analog message locations 220 and a session numbers element 221. The analog voice messages received from the PSTN 103 are processed by an encoder 216 under the control of the processor 214 and are stored in the analog message locations 220. For information on the analog voice compression encoder refer to U.S. patent application Ser. No. 08/395,739 filed Feb. 28, 1995 by Satyamurti et al., which is assigned to the assignee of the present invention and which is hereby incorporated by reference herein. The compressed analog voice messages generated by the encoder 216 are preferably stored in a first memory portion in a RAM 218, coupled to the processor 214, in a digital format in accordance with the preferred embodiment of the present invention. In an alternative embodiment of the present invention, a second memory portion stores the compressed analog voice messages in an analog format. The analog memory preferably uses an analog memory device such as the IDS1020 manufactured by Information Storage Devices, Inc. The compressed analog messages in the analog message locations 220 are transmitted to the base stations 114 by way of the communication links 116.

The processor 214 also is coupled to a read-only memory (ROM) 222 which stores firmware elements for use by the processor 214. It will be appreciated that other types of memory, e.g., electrically erasable programmable ROM (EEPROM) or magnetic disk memory, can be utilized as well for the ROM 222 and/or RAM 218. It will be further appreciated that the RAM 218 and the ROM 222, singly or in combination, can be integrated as a contiguous portion of the processor 214. Preferably, the processor 214 is similar to the DSP56100 digital signal processor (DSP) manufactured by Motorola, Inc. of Schaumburg, Ill. It will be appreciated that other similar processors can be utilized as well for the processor 214, and that additional processors of the same or alternate type can be added as required to handle the processing requirements of the system controller 102.

The firmware elements include a call processing element 224 for handling the processing of an incoming call for a called party and for controlling the base stations 114 to send a message to the portable communication transceiver 118 corresponding to the called party. The call processing element 224 selects from selective call addresses 226 stored in ROM 222 to determine the address of the portable communication transceiver 118 corresponding to the called party. A session number assignor 228 assigns a session number to the compressed analog message. The session number assignor 228 stores the session numbers associated with the compressed analog messages in the session numbers element 221 stored in RAM 218. The processor 214 uses a transmission element 230 for transmitting addressing information to the base stations 114, which includes the selective call address of the portable communication transceiver 118, the session number associated with the compressed analog voice message, and the compressed analog voice message. The transmission element 230 also processes acknowledgment messages from the portable communication transceiver 118 indicating that the transmitted message has been received. When no received message acknowledgment is received from the portable communication transceiver 118, the transmission element 230 re-transmits the message. The number of re-transmissions attempts is constrained by the resend count stored in a resend count element 219 in RAM 218. A re-transmission element 232 used by the processor 214 handles processing of re-transmission requests from the portable communication transceivers 118 received from the base stations 114. In the preferred embodiment of the present invention, a received re-transmission request includes a selective call address of the portable communication transceiver 118, the session number of the compressed analog message to be re-transmitted and a code word command indicating a re-transmission is requested. In an alternative embodiment of the present invention, a received re-transmission request includes the selective call address of the portable communication transceiver 118 and the session number of the analog compressed message to be re-transmitted. The selective call address of the portable communication transceiver 118 serves as an identifier for the portable communication transceiver 118 and also as a command for requesting re-transmission of the message. With the received selective call address and session number, the re-transmission element 232 reads the appropriate session number and analog message stored in RAM 218, and transmits the selective call address, session number, and analog compressed message to the base stations 114 via the communication links 116 as described above for the operation of the transmission element 230.

The base station's 114 cell controller 106 receives selective call messages, destined for portable communication transceivers 118, from the processor 214 and sends the messages to the cell transmitter 108 for outbound transmission utilizing techniques well known in the art. The cell transmitter 108 preferably transmits using a digital modulation technique such as two and four level FSK to send addressing messages in a first modulation format using a frequency modulation (FM) modulator 202 to the portable communication transceivers 118. Subsequently, the cell transmitter 108 transmits using an analog modulation technique such as AM SSB to send analog compressed voice messages in a second modulation format using an AM modulator 204 to the portable communication transceivers 118. It will be appreciated that for digitized voice message and/or data message transmissions other signaling formats can by utilized such as M-ary quadrature amplitude modulation (MQAM). The cell controller 106 is also coupled to at least one cell receiver 112 utilizing conventional techniques well known in the art. The cell receiver 112 preferably demodulates four level FSK and can be collocated with the base stations 114, as shown in FIG. 2, but preferably is positioned remote from the base stations 114 to avoid interference from the cell transmitter 108. The cell receiver 112 receives one or more acknowledgments and/or re-transmission requests from one of the portable communication transceivers 118 as will be described below. For information on the operation and structure of an acknowledge-back communication system, refer to U.S. Pat. No. 4,875,038 to Siwiak et al., which is assigned to the assignee of the present invention and which is hereby incorporated by reference herein.

The cell controller 106 also includes a read-only memory (ROM) 205 comprising a protocol encoder 206 firmware element for use by the cell controller 106. The protocol encoder 206 is used for encoding the selective call address and the session number into the first modulation format in the outbound channel protocol, the details of which will be discussed below. The protocol encoder 206 reads the selective call addresses 208 and session numbers 210 received from the system controller 102 which are temporarily stored in a random access memory (RAM) 207. The cell controller 106 stores compressed analog messages in a random access memory (RAM) 207 in message locations 212. The compressed analog messages are preferably stored in a digital format in the RAM 207 of the cell controller 106, but can alternatively be stored in an analog format as specified in the alternative embodiment. The cell controller 106 sends the compressed analog message to be transmitted to the portable communication transceiver 118 to the cell transmitter 108 which in turn transmits the message in a second modulation format using AM SSB.

Figure 3:
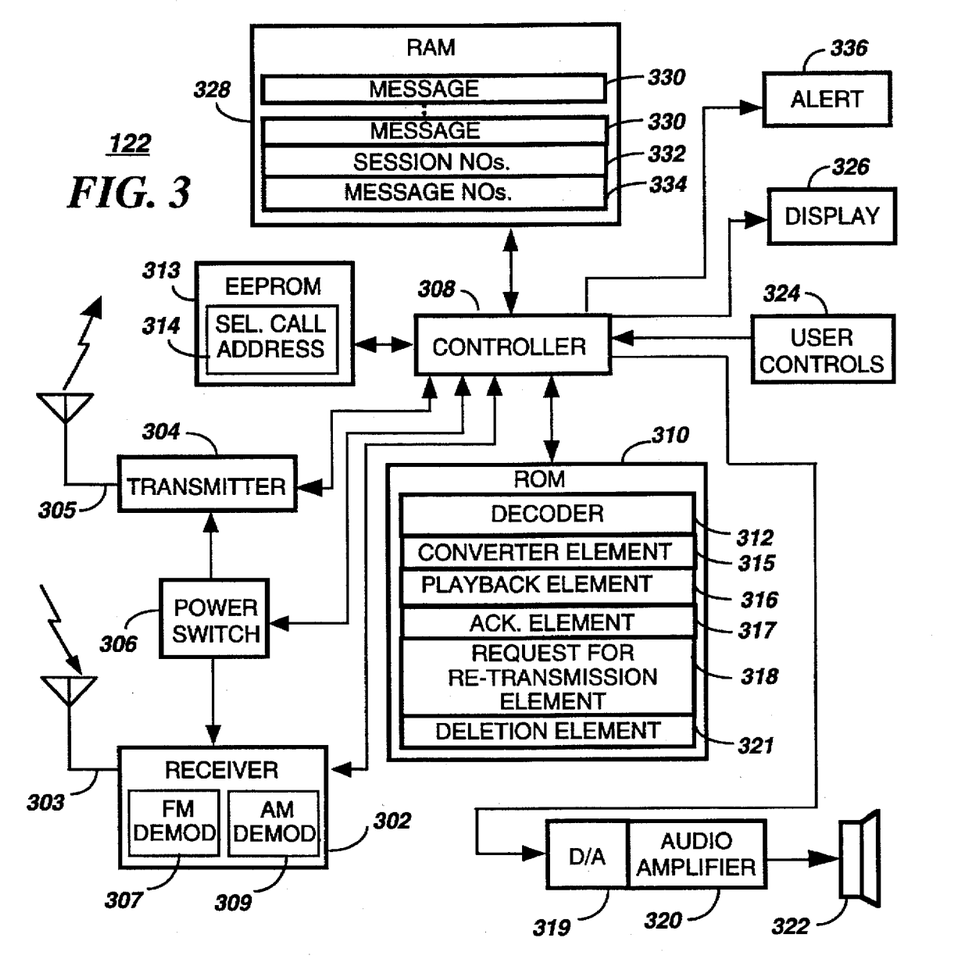
FIG. 3 is an electrical block diagram of a portable communication transceiver in accordance with the preferred embodiment of the present invention.

Referring to FIG. 3, an electrical block diagram of the portable communication transceiver 118 in accordance with the preferred embodiment of the present invention includes a transmitter antenna 305 for transmitting radio signals to the base station 114 and a receiver antenna 303 for intercepting radio signals from the base stations 114. The transmitter antenna 305 is coupled to a transmitter 304 providing a means for transmitting inbound messages, while the receiver antenna 303 is coupled to a receiver 302 providing a means for receiving outbound messages. The receiver 302 includes an FM demodulator 307 and AM demodulator 309 for demodulating the first modulation format and second modulation format in accordance with the preferred embodiment of the present invention. The radio signals received from the base stations 114 use conventional two and four level FSK in the first modulation format and AM SSB in the second modulation format. Radio signals transmitted by the portable communication transceiver 118 to the base stations 114 use two and four level FSK. Radio signals received by the receiver 302 produce demodulated information at the output. The demodulated information is coupled to the input of a controller 308, which processes the information in a manner well known in the art. Similarly, inbound response messages are processed by the controller 308 and delivered to the transmitter 304 which is coupled to the controller 308. The response messages transmitted by the transmitter 304 are preferably modulated using four-level FSK.

A conventional power switch 306, coupled to the controller 308, is used to control the supply of power to the transmitter 304 and the receiver 302, thereby providing a battery saving function. The controller 308 is coupled to a random access memory (RAM) 328 which stores messages in a message location 330. The RAM 328 further comprises a session numbers element 332 and a message numbers element 334. The session numbers element 332 stores the session numbers associated with the received messages on the outbound protocol in the first modulation format. The message numbers stored in the message numbers element 334 are generated by the firmware elements of the controller 308 for user message identification, as will be described below. It will be appreciated that re-programmable nonvolatile memory devices can be used to prevent loss of the data stored in RAM 328 during a power outage such as, for example, EEPROM, FLASH, etc.

The controller 308 also is coupled to a read-only memory (ROM) 310 which stores firmware elements for use by the controller 308. It will be appreciated that other types of memory, e.g., electrically erasable programmable ROM (EEPROM), can be utilized as well for the ROM 310. The firmware elements include a decoder element 312 which reads one or more addresses, stored in the selective call address element 314 in an EEPROM 313, for decoding incoming messages on the outbound channel using techniques well known in the art. When an address is received by the controller 308, the decoder element 312 compares one or more predetermined addresses in the selective call addresses element 314 stored in EEPROM 313, and when a match is detected, a call alerting signal is generated to alert a user that a message has been received. The decoder element 312 also generates a message number associated with the received message and stores the message number in the message numbers element 334 in RAM 328. The message number is displayed to the user on a display 326 providing an identification number for the user to distinguish the received message from other stored messages. The call alerting signal is directed to a conventional audible or tactile alerting device 336 for generating an audible or tactile call alerting signal. In addition, the decoder element 312 processes the message which is received in a digitized manner described above and then stores the message in a message location 330 and the session number associated with the received message in a session numbers element 332 in RAM 328. The session numbers, as described above, are embedded in a message vector received on the outbound channel. Both the message number and the session number are associated with the same message, but only the message number is viewed on the display 326. The message can be accessed by the user through user controls 324, which provides a means for manually selecting functions such as lock, unlock, delete, play out, etc. More specifically, by the use of appropriate functions provided by the user controls 324, the message is recovered from the RAM 328, and then played out through the audio circuit as is will be described below.

The firmware elements stored in ROM 310 include a converter element 315, a playback element 316, an acknowledgment element 317, a request for re-transmission element 318 and a deletion element 321. The converter element 315 converts the compressed analog massage stored in the message locations 330 into a voice message using techniques as described in Satyamurti et al. referenced above. The playback element 316 controls the playback circuit which plays out the voice message after it has been decompressed by the converter element 315. The playback circuit comprises a conventional digital to analog converter (D/A) 319 coupled to the controller 308 and an audio amplifier 320 which amplifies the voice message to be played out on a speaker 322. The playback circuit utilizes conventional techniques well known in the art. The acknowledgment element 317 processes acknowledgment messages which indicate to the base stations 114 that the message has been received properly. The acknowledgment element 317 sends the acknowledgment message to the transmitter 304 which transmits the message to the base stations 114 in four level FSK utilizing techniques well known in the art.

The request for re-transmission element 318 transmits messages to transmitter 304 which request re-transmission of an analog compressed message from the base stations 114. There are two conditions which invoke the request for re-transmission element 318. Playback selection is provide by way of the user controls. When the user plays out the voice message, by way of the user controls 324, and perceives the message is either unintelligible or of unacceptable quality, then the user requests re-transmission of the voice message by the use of appropriate functions provided by the user controls 324. In the preferred embodiment of the present invention, the request for re-transmission element 318 will read the message number associated with the voice message played out and transmit the request for re-transmission from the base stations 114 by sending the session number, the selective call address 314 of the portable communication transceiver 118 and a code word representing a command for requesting re-transmission of the message. In an alternative embodiment of the present invention, there is no code word command, and instead the selective call address 314 itself serves as the request for re-transmission command. The second condition which invokes the re-transmission element 318 is the case when the message has been deleted by the user and the user would like to recover the message. In this instance, when the user deletes a message the deletion element 321 deletes the message stored in the message location 330, but maintains the message number and the session number stored the message numbers element 334 and session numbers element 332 stored in RAM 328. In addition, to indicate to the user that the message has been deleted, the deletion element 321 preferably flashes the message number on the display 326. It will be appreciated that other deletion alerting methods may be used such as an icon indicator on the display 326 or an audible alert indicating a deleted message. In an alternative embodiment of the present invention the deletion and/or request for re-transmission of messages may also include digital voice messages and/or data messages. With the session number and the message number stored in RAM 328, the user may request re-transmission of a compressed analog message by the use of appropriate functions provided by the user controls 324. If, however, the message associated with the flashing message number on the display 326 is deleted a second time by way of the user controls 324, then the message number and session number associated with the message will be deleted and the user will not be able to request re-transmission of the message.

Figure 4:
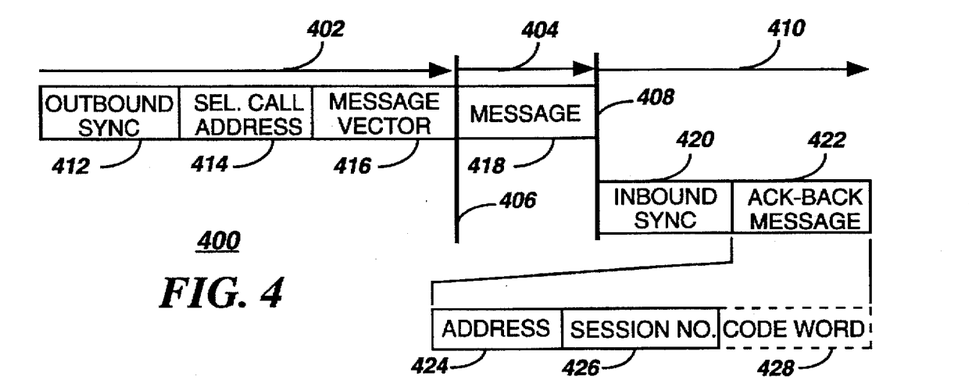
FIG. 4 is a timing diagram of an outbound message transmission protocol and an inbound message transmission protocol of the fixed and portable portions of the communication system in accordance with the preferred embodiment of the present invention.

Referring to FIG. 4, a timing diagram depicts elements of the signaling format utilized in the outbound message transmission protocol and the inbound message transmission protocol of the fixed portion and portable portion of the communication system 100 in accordance with the preferred embodiment of the present invention. The signaling format operating on the outbound and inbound channels preferably operates on separate carrier frequencies utilizing well-known time frequency division multiplexing (FDM) techniques. Using FDM transmission, the outbound RF channel transmission is depicted as a first time interval 402 for digital two and four level FSK transmission in the first modulation format and a second time interval 404 for compressed analog message transmission in AM SSB in a second modulation format, while the inbound RF channel transmission is depicted as a third time interval 410 using four level FSK. The outbound first time interval 402 is divided from the second time interval 404 by the outbound time boundary 406. The outbound time boundary 406 depicts a point in time when the outbound transmissions in the first modulation format cease and the outbound transmissions in the second modulation format commence. Similarly, the outbound second time interval 404 is divided from the third time interval 410 by the outbound to inbound time boundary 408. The outbound to inbound time boundary 408 depicts a point in time when the outbound transmissions in the second modulation format cease and the inbound transmissions commence.

The elements of the outbound message transmission protocol comprise an outbound sync 412, a selective call address 414, a message vector 416 and a compressed analog message 418, while the inbound message transmission protocol comprises an inbound sync 420 and an acknowledge-back message 422. The outbound sync 412 provides the portable communication transceiver 118 a signal for synchronization utilizing techniques well known in the art. The selective call address 414 identifies the portable communication transceiver 118 which the compressed analog message 418 is intended. The message vector 416 points in time within the signal format to the position of the analog compressed message 418 to be received by the portable communication transceiver 118. In addition, the session number associated with the compressed analog message is embedded in the message vector 416. Similarly, the inbound sync 420 provides the base stations 114 a signal for synchronization utilizing techniques well known in the art. In a preferred embodiment of the present invention, the acknowledge-back message 422 comprises an address 424, a session number 426 and a code word 428. The code word 428 serves as a re-transmission request command understood by the base stations 114. In an alternative embodiment of the present invention, the code word 428 is not present and instead the address 424 serves as an identifier for the portable communication transceiver 118 and also as a command for requesting re-transmission of a message. The address 424 is preferably the selective call address of the portable communication transceiver 118. The session number 426 identifies the compressed analog message to be re-transmitted from the base stations 114.

Figure 5:
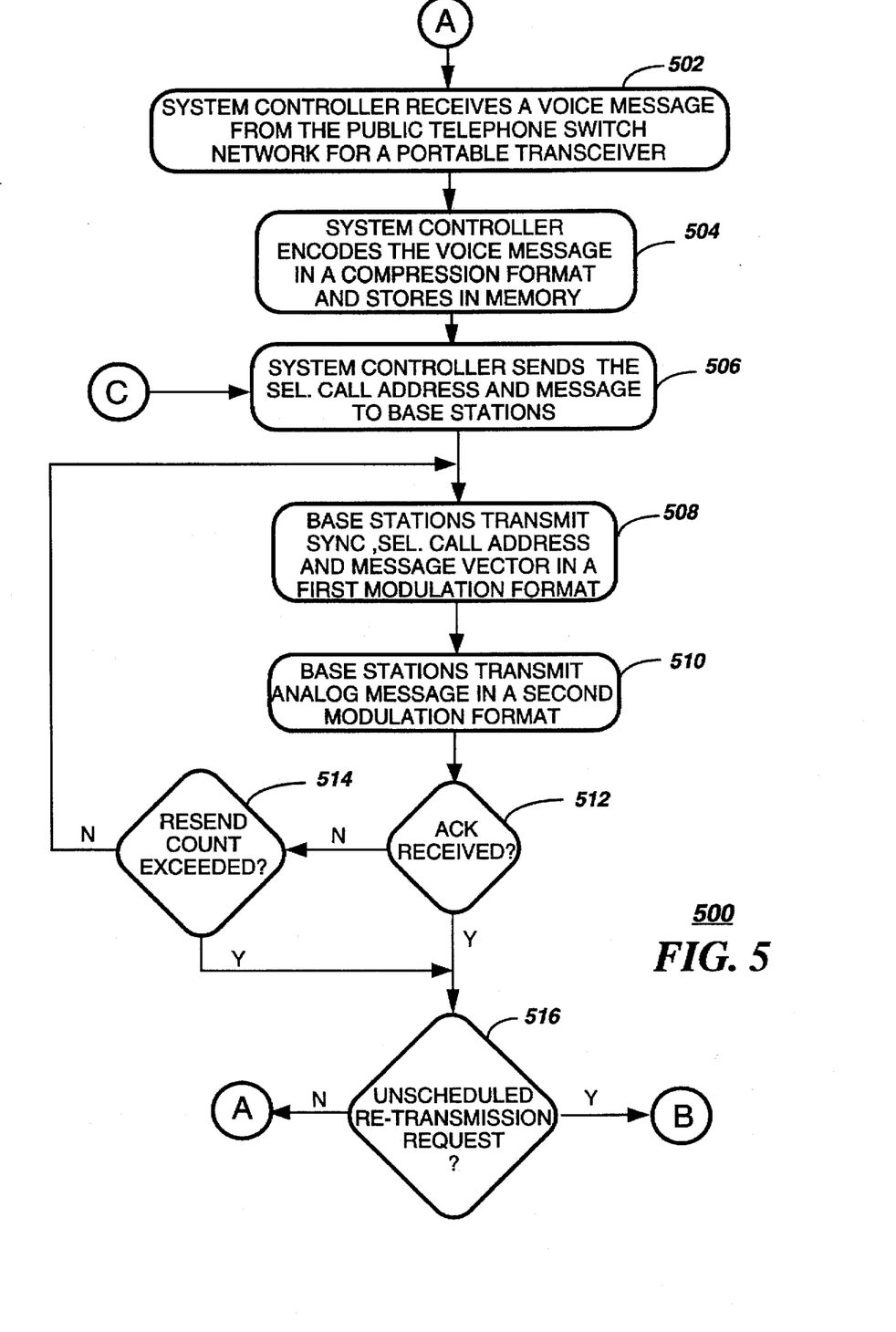
FIGS. 5 and 6 are flow charts depicting operation of the fixed portion of the communication system in accordance with the preferred embodiment of the present invention.

Referring to FIG. 5, a flow chart 500 summarizing the operation of the fixed portion of the communication system 100 in accordance with the preferred embodiment of the present invention begins with step 502 where the system controller 102 receives a voice message from the PSTN 103 destined for a portable communication transceiver 118. In step 504 the system controller encodes the voice message in a compression format processed by the encoder 216 and is stored in the analog message location 220 of the system controller 102 RAM 218. In step 506 the system controller 102 sends the selective call address and message to base stations 114. In step 508 the base stations 114 transmit the outbound signal comprising an outbound sync 412, selective call address 414, message vector 416 in a first modulation format. In step 510 the analog message 418 is transmitted at a time specified by the message vector 416 in a second modulation format. In step 512 the base station 114 checks for an acknowledgment from the portable communication transceiver 118 indicating that the message has been received. When no acknowledgment is received, then in step 514 the base station 114 checks for a resend count. When the resend count is not exceeded then the base station 114 proceeds to step 508 where the message is re-transmitted. If the amount of message re-transmissions exceeds the resend count, or a message acknowledgment is received, then the base station proceeds to step 516. In step 516 the base station 114 checks for an unscheduled re-transmission request from the portable communication transceiver 118. If no re-transmission requests have been received, then the base station 114 proceeds to step 502 where the system controller 102 processes new messages from the PSTN 103. If a re-transmission requests has been received, then the base station proceeds to step 602 (of FIG. 6), as will be described below.

Figure 6:
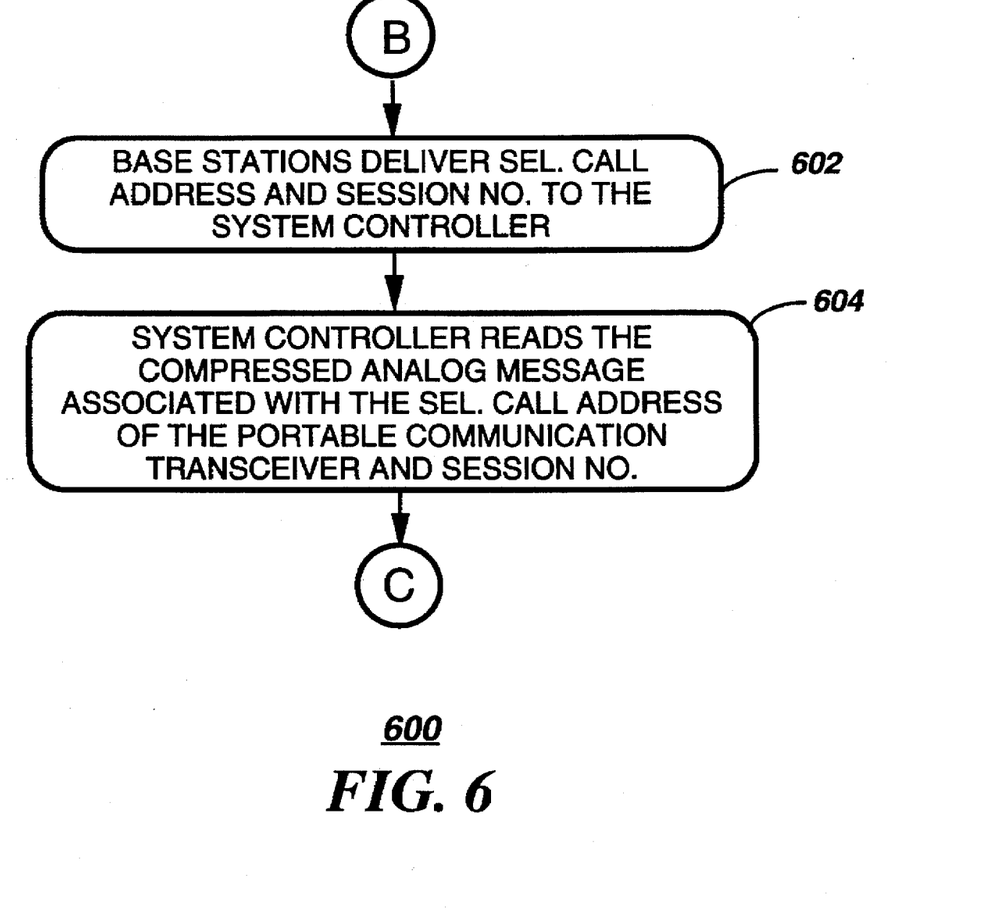

Referring to FIG. 6, a continuation flow chart 600 of FIG. 5 summarizing the operation of the fixed portion of the communication system 100 in accordance with the preferred embodiment of the present invention begins with step 602 where the base station 114 delivers the request for re-transmission message to the system controller 102. The request for re-transmission message preferably comprises the selective call address of the portable communication transceiver 118, the session number 426 associated with the compressed analog message to be re-transmitted and a code word 428. In an alternative embodiment of the present invention, the code word 428 is not present and instead the address 424 serves as an identifier for the portable communication transceiver 118 and also as a command for requesting re-transmission of a message. In step 604 the system controller 102 reads the compressed analog message associated with the address 424 of the portable communication transceiver 118 and session number 426 and proceeds to step 506 in FIG. 5 where the message is transmitted to the base stations 114 via the communication links 116 for transmission. It will be appreciated that the system provider can program the system controller 102 to re-process the compressed analog message and thereby reduce the compression level of the compressed analog message to be re-transmitted. This will provide the subscriber user requesting the re-transmitted message an improved message quality from the first transmitted message.

Figure 7:
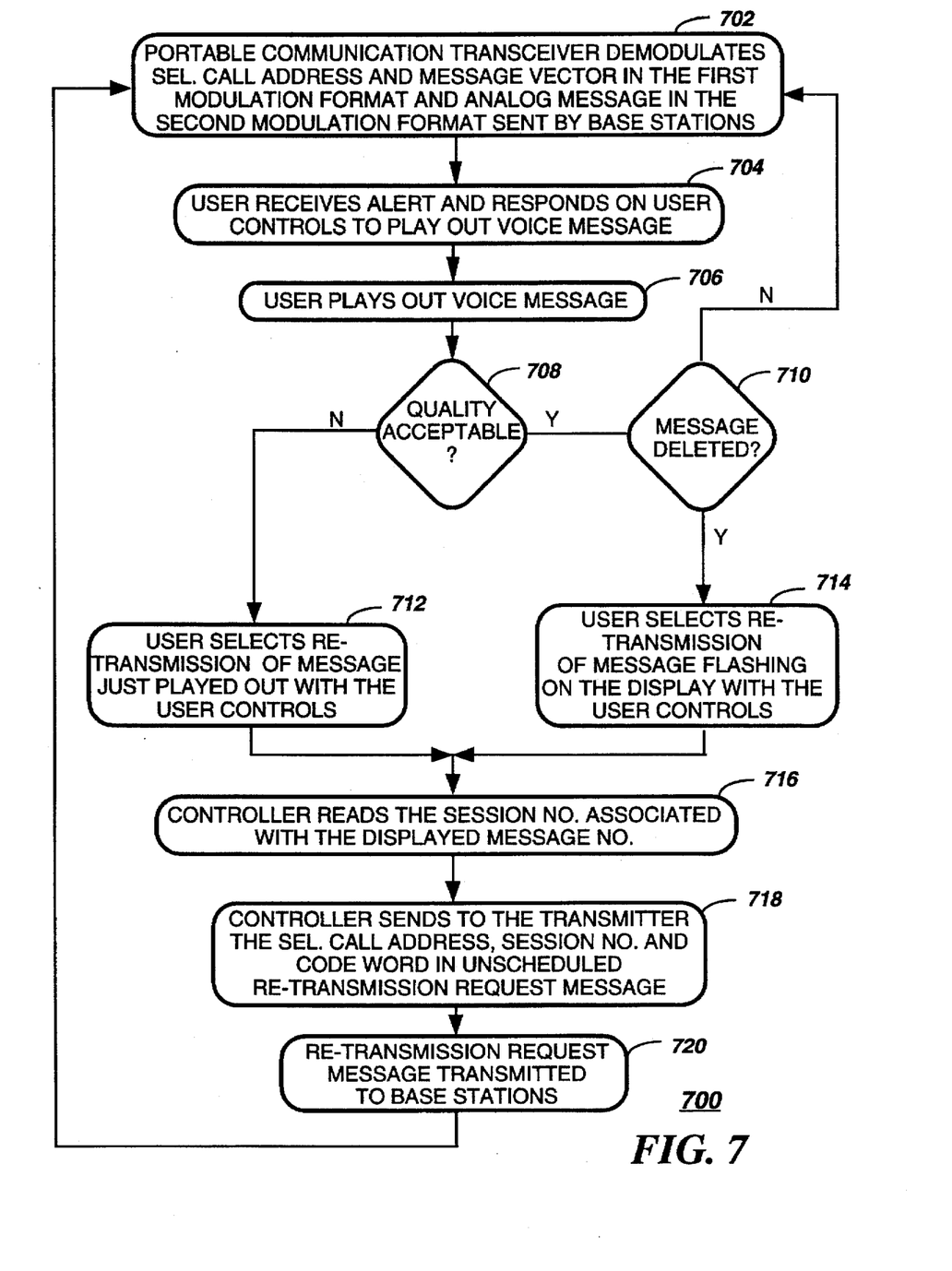
FIG. 7 is a flow chart depicting operation of the portable communication transceiver in accordance with the preferred embodiment of the present invention.

Referring to FIG. 7, a flow chart 700 summarizing the operation of the portable communication transceiver 118 in accordance with the preferred embodiment of the present invention begins with step 702 where the portable communication transceiver 118 demodulates the selective call address 414 and message vector 416 in the first modulation format, and demodulates the compressed analog message 418 in the second modulation format. In step 704 the user receives an alert and responds by the use of appropriate functions provided by the user controls 324 to read the message stored in the portable communication transceiver's 118 RAM 328. In step 706 the compressed message is decompressed by a converter and played out an audio circuit which provides the user with a replica of the original voice message delivered to the system controller 102 from the PSTN 103. In step 708 the user of the portable communication transceiver 118 notes the quality of the voice message. If the user perceives the message to be unintelligible or of unacceptable quality, then the user proceeds to step 712. When the message quality is acceptable then in step 710 the user has an option to recover a deleted message. This message may be the message just played out which the user may have deleted, or previous deleted messages which the user may want to recover. In step 712 the user selects re-transmission of the message played out in step 706 by the use of appropriate functions provided by the user controls 324. It will be appreciated that the user may also request for re-transmission of a message while the message is being played out. In step 714 the user selects re-transmission of a partially deleted message which comprises a message number and session number stored in the portable transceiver's 118 RAM 328. A partially deleted message is preferably indicated on the display 326 by a flashing message number. As described above, to completely delete a message at least a second request for deletion must be made by the user to delete the message. Once a message has been deleted by more than one deletion request, then the message will no longer have a session number or message number, thus the message can not be recovered. Once the user has requested re-transmission of a message by way of the user controls 324, then in step 716 the controller 308 of the portable communication transceiver 118 reads the session number associated with the displayed message number from RAM 328. In step 718 the controller 308 sends to the transmitter 304 an unscheduled re-transmission request message comprising the inbound sync 420, the portable communication transceiver's 118 address 424 and session number 426 in accordance with the preferred embodiment of the present invention. In an alternative embodiment of the present invention a code word 428 is also sent as described above. In step 720 the re-transmission request message is transmitted to the base stations 114. The controller 308 then proceeds to step 702 where the message reception process continues.

Thus, it should be apparent by now that the present invention provides a method and apparatus for a user to request message re-transmission on demand when the received message is perceived to be unintelligible or of unacceptable quality. In addition, the present invention provides a means for re-transmission of partially deleted messages.

We claim:

1. A communication system providing compressed analog message re-transmission on demand, the communication system comprising:

a base station comprising
        means for receiving an address, a session number and a compressed analog message transmitted from a system controller,
        a memory comprising
            a first memory portion for storing the address and the session number as information in a digital format, and
            a second memory portion for storing the compressed analog message as information in an analog format,
        a cell transmitter for transmitting the address and the session number modulated in a first modulation format and the compressed analog message modulated in a second modulation format,
        at least one cell receiver for receiving a request for re-transmission of the compressed analog message, and
        a cell controller, coupled to said memory, and responsive to the request for re-transmission received for controlling a re-transmission of the compressed analog message which is stored; and
    a portable communication transceiver, comprising
        a receiver for receiving the address and the session number modulated in the first modulation format and the compressed analog message modulated in the second modulation format,
        a decoder, coupled to said receiver, for decoding the address and in response thereto storing the session number and the compressed analog message in a memory when the address matches a predetermined address assigned to the portable communication transceiver,
        a playback circuit for controlling playback of the compressed analog message stored in said memory for a user,
        means for manually generating the request for re-transmission of the compressed analog message when audio quality as perceived to the user is unintelligible, and
        a transmitter for transmitting the request for message re-transmission.

2. The communication system according to claim 1, wherein the system controller comprises:

an input interface for receiving a voice message directed to a portable communication transceiver;
    an encoder for encoding the voice message into the compressed analog message;

a session number assignor for assigning the session number to the compressed analog message;

a memory for storing the compressed analog message, the session number and the address identifying the portable communication transceiver to which the compressed analog message is directed; and means for transmitting the stored address, session number and compressed analog message to said base station.

3. The communication system according to claim 1 wherein said cell controller further controls recovery of the address, the session number and the compressed analog message from said memory, and wherein said cell transmitter comprises:

a first modulator for modulating the address and session number recovered from the memory using the first modulation format; and a second modulator for modulating the compressed analog message recovered from the memory using the second modulation format.

4. The communication system according to claim 1, wherein the request for re-transmission of the compressed analog message comprises a transmission of the address identifying the portable communication transceiver, and the session number of the compressed analog message to be re-transmitted.

5. The communication system according to claim 1, wherein the request for re-transmission of the compressed analog message comprises transmission of an address identifying the portable communication transceiver, a code word identifying the request for re-transmission and the session number of the compressed analog message to be re-transmitted.

6. The communication system according to claim 1 wherein the address, the session number, and the compressed analog message are transmitted as information in a digital format, and wherein said memory comprises:

a first memory portion for storing the address and the session number as information in the digital format; and a second memory portion for storing the compressed analog message as information in the digital format.

7. The communication system according to claim 1 wherein the first modulation format is a digital modulation format.

8. The communication system according to claim 1 wherein said base station further comprises an encoder for encoding the address and the session number into a predetermined signaling protocol for transmission.

9. A portable communication transceiver, comprising:

a receiver for receiving an address and a session number modulated in a first modulation format and a compressed analog message depicting a voice message modulated in a second modulation format;

a decoder, coupled to said receiver, for decoding the address, and in response thereto, for storing the session number and the compressed analog message in a memory when the address matches a predetermined address assigned to the portable communication transceiver;

a memory comprising a first memory portion for storing the address and the session number as information in a digital format, and a second memory portion for storing the compressed analog message as information in an analog format;

a playback circuit for controlling playback of the compressed analog message stored in said memory as a replica of the voice message for a user; and means for manually generating a request for re-transmission of the compressed analog message when audio quality of the voice message is perceived to be unintelligible to the user.

10. The portable communication transceiver of claim 9, wherein said first modulation format is a digital modulation format.

11. The portable communication transceiver of claim 9, wherein said second modulation format is an analog modulation format.

12. The portable communication transceiver of claim 9, wherein said playback circuit comprises:

a playback selector for enabling the user to request playback of the compressed analog message;

a controller, responsive to the playback selector, for controlling recovery of the compressed analog message from said memory;

a converter, coupled to said controller, for converting the compressed analog message recovered from said memory into a voice message; and an audio circuit for reproducing a replica of the voice message for the user.

13. The portable communication transceiver of claim 12, wherein said playback circuit further comprises:

a display for presenting information, and wherein said controller is further responsive to said playback selector for controlling recovery of the message number for presentation on said display as the voice message is being reproduced.

14. The portable communication transceiver of claim 13, further comprises a transmitter, responsive to said means for manually generating a request for re-transmission, for transmitting the request for re-transmission of the compressed analog message.

15. The portable communication transceiver of claim 14, further comprising a means for deleting a compressed analog message, wherein said means for manually generating a request for re-transmission of the compressed analog message further generates a request for a re-transmission of a compressed analog message which has been deleted.

16. The portable communication transceiver of claim 15, wherein said means for deleting a compressed analog message comprises:

a user control for enabling the user to delete a compressed analog message;

an indicator for indicating on said display when the compressed analog message has been deleted; and wherein deletion of the compressed analog message from memory does not delete the message number and the session number.

17. The portable communication transceiver of claim 15, wherein said means for manually generating a request for re-transmission generates the request for re-transmission of the compressed analog message which was deleted.

18. The portable communication transceiver of claim 9, wherein said request for re-transmission includes transmission of the address identifying the portable communication transceiver and the session number of the compressed analog message to be re-transmitted.

19. The portable communication transceiver of claim 9, wherein the address identifying the portable communication transceiver provides the request for re-transmission of the compressed analog message.

20. The portable communication transceiver of claim 9, wherein the request for re-transmission of the compressed analog message includes transmission of the address identifying the portable communication transceiver, a code word identifying the request for re-transmission and the session number of the compressed analog message to be re-transmitted.

* * * * *